United States Patent [19]

Pei

[11] 4,018,215

[45] Apr. 19, 1977

[54] LIQUID OPERATED SOLAR ENERGY COLLECTOR

[75] Inventor: Yu K. Pei, Toledo, Ohio

[73] Assignee: Owens-Illinois, Inc., Toledo, Ohio

[22] Filed: July 28, 1975

[21] Appl. No.: 599,558

[52] U.S. Cl. .............................. 126/271; 126/270; 165/142; 285/133 R; 285/345; 285/DIG. 12

[51] Int. Cl.² .......................................... F24J 3/02

[58] Field of Search ........... 126/270, 271; 237/1 A; 285/DIG. 12, 133 R, 137 R, 189, 345; 165/142

[56] References Cited

UNITED STATES PATENTS

| 980,505 | 1/1911 | Emmet | 126/271 |
|---|---|---|---|
| 2,243,593 | 5/1941 | Zallea | 165/142 |
| 3,351,361 | 11/1967 | Martin | 285/133 R |

Primary Examiner—Kenneth W. Sprague
Assistant Examiner—James C. Yeung
Attorney, Agent, or Firm—John R. Nelson

[57] ABSTRACT

There is disclosed a solar energy collector assembly in which the working media is a liquid circulated through the several tubular collectors in series. The manifold device is of a design that is inexpensive to fabricate for detachably inserting tubular collectors into opposite sides of the liquid manifold. The assembly includes an inlet for liquid to enter an outer tube of the collector and flow in one direction to the end and thereat enter an inner tube and flow in an opposite direction to the other far end of the inner tube, finally transferring to the manifold outlet connected to the next tube or tubes in the series. The receptacles of the manifold for connecting the collector tubes are fabricated from metal stampings and/or castings and surrounded with molded insulation, such as foamed plastic, e.g. polystyrene, polyethylene, polyurethane or the like.

13 Claims, 8 Drawing Figures

LIQUID OPERATED SOLAR ENERGY COLLECTOR

The invention relates to the collection and conversion of the sun's energy by absorption in the form of heat exchanged through surfaces having selective energy-absorbing coatings. More particularly, the invention is germane to the tubular type of solar energy collectors which operate in an array comprised of several tube collectors connected into a manifold for transferring and circulating a liquid working media for heat or energy exchange, by absorption, with the energy-absorption coated surface.

BACKGROUND OF THE INVENTION

There are in operation, at least on a limited scale today, two basic types of solar energy collecting systems; a so-called flat-plate collector comprised of a plate of glass and an energy absorbing surface spaced therebeneath, i.e., away from the sun. At the back of the absorbing surface the heat exchange media in either gas or liquid form is circulated to exchange the heat of the sun to the exchange media. Another type is the double-walled glass tubular collector in which a glass outer tube is sealed to a spaced inner tube and the space evacuated. The inner tube has an energy absorbing coating over its exposed surface and the heat exchange media is circulated on the inside of the inner tube to absorb solar heat collected by the inner tube. Several of the tubular collectors are connected into a manifold system which furnishes the media to the tubes and transfers the heated media for storage or use of the sun's energy that is absorbed in the apparatus. One of the drawbacks of the tubular collector, as compared with the flat plate collector, is the difficulty with which many tubes of a collector assembly may be connected to a manifold and function as a unit.

THE INVENTION

The present invention provides a manifold for tubular collectors for operation with a liquid heat exchange media which is designed to simplify the connection of several tubes to the manifold and reduce the cost of the manifold. More particularly, the invention provides for a channel for the liquid flow in series between the several tubular collectors. The manifold provided is inexpensive to manufacture and provides for ease of assembly of the tubes in connecting them to the manifold for operation, or for replacing them. Also, the performance of the solar collector assembly is enhanced. This is attributable to the fact that the series flow of the liquid heat exchange media provides the same volume of liquid to each collector tube in the series assembly.

It will be apparent that other advantages and features will be readily understood by those skilled in the art after they have read the detailed description and referred to the accompanying drawings which illustrate what are presently considered to be preferred embodiments of the best mode contemplated for utilizing the novel and improved structure set forth in the appended claims.

DETAILED DESCRIPTION

Figure 1:
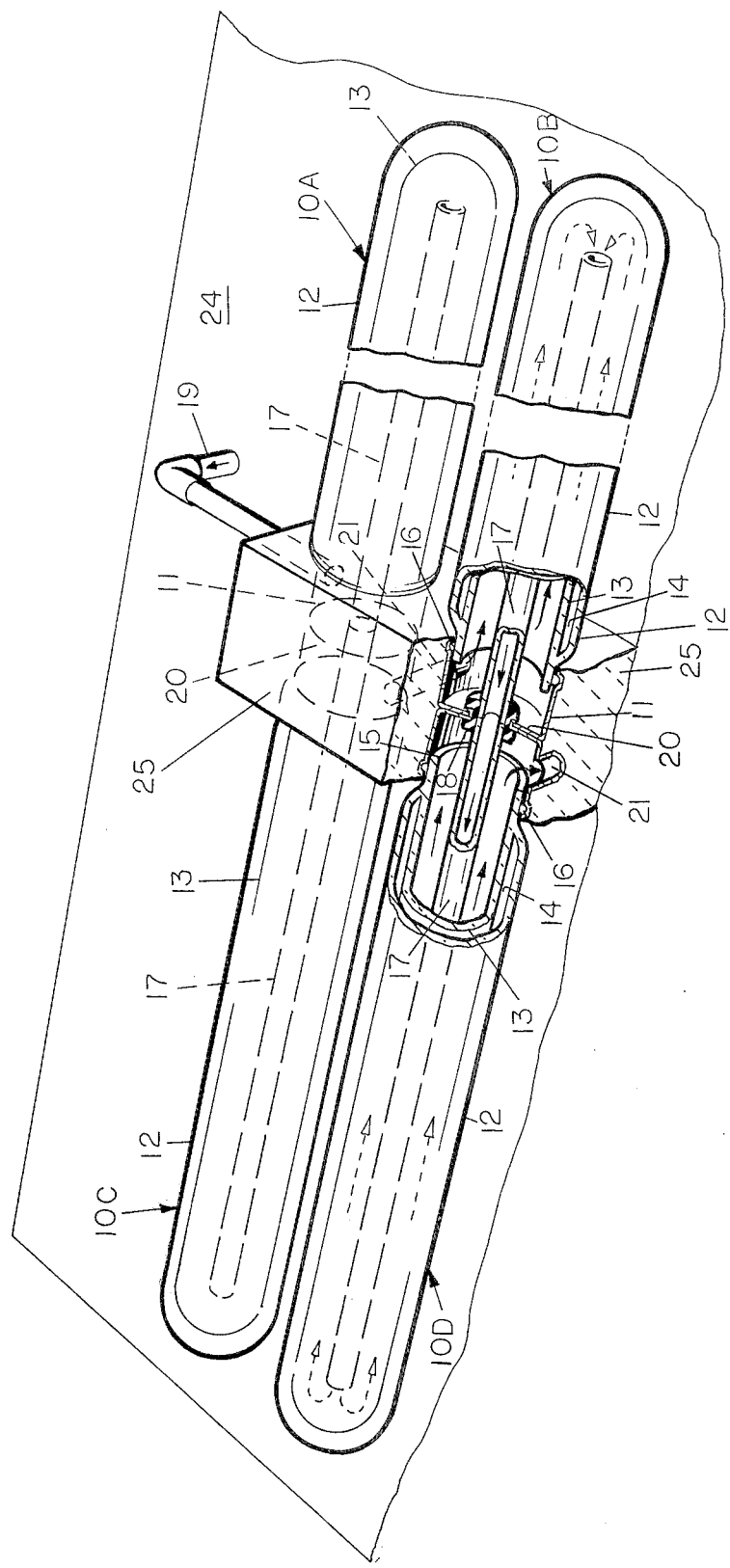
FIG. 1 is a perspective view, partly broken away and in section, of a portion of a tubular solar energy collector assembly on a roof exposure of the building, including the liquid manifold installation of the present invention.

FIG. 1 illustrates a preferred embodiment of the invention and the operation of a solar collector in accordance therewith. A plurality of tubular collectors of a solar energy collection system are arranged in an array or module fashion. The tubular collectors, shown as a part of this module, are indicated at 10A-10D. The balance of the collectors in a module are the same as those shown. The tubular collectors are mounted on each side of a manifold 11. All of the tubular collectors 10A through 10D are identical in construction. Collectors 10B and 10D, opposite each other on the sides of manifold 11 have been shown partially broken away and in cross section in order to explain the structure of the collectors and their connection into manifold 11 and their operation in conjunction therewith. An outer transparent tube 12 has one closed end which extends beyond the manifold 11 and an open end which is connected into the manifold. An inner tube 13 is sealed to the outer tube 12 near the open end of the outer tube 12. The inner tube 13 may also be glass, but could be metal, and is "blackened" or coated with a material which provides an overall selectively absorbing coating layer to absorb the solar energy directly. The space 14 between the tubes 12 and 13 is evacuated or reduced to sub-atmospheric pressure to reduce conduction losses of energy (heat) from the collector. The manifold receptacle for the collector tubes is comprised of an annular wall which is divided by the integral center wall 20 into two compartments 22 and 23. The compartments are connected through the center aperture punched in wall 20 by means hereinafter described. The open end of the outer tube 12 is held in an aperture 15 provided by the manifold 11 and in sealing engagement in a gasket or O-ring 16 comprised of rubber or plastic of known composition. An annular cross-connecting tube 17 extends from a position adjacent the closed end of the inner tube 13 of the collector 10B to a position adjacent the closed end of the inner tube 13 of the collector 10D. The collectors 10B and 10D are in communication only through the cross-connecting tube 17, and the cross-connecting tube 17 is mounted in a seal gasket 18 secured within the center aperture of the wall 20 dividing compartments 22 and 23 to ensure that the only path available for fluid travel from one compartment to the other is along and through the cross-connecting tube 17.

The solar energy that is incident upon the coated inner tube 13 will result in a temperature increase of the tube 13. The working fluid, e.g. water, to be heated by solar energy is pumped from a source in the system (not shown) and enters the manifold 11 through an inlet line 19. The fluid is first directed along the length of the tubular collector 10A around the exterior of the cross-connecting tube 17 therein and in heat exchange contact with the inner surface of inner tube 13 of the collector. The fluid flows along the length of tube 13 to near its far end and there enters the cross-connecting tube 17. From there, the fluid flows the length of tube 17 and exists at its opposite end inside of tubular collector 10C near its closed end. The fluid, laden with some solar energy, enters the space inside the inner tube 13 of collector 10C and flows back toward the manifold 11. In the return pass, solar heat absorbed by the coated tube 13 is exchanged (added) to the working fluid adding more solar energy and increasing temperature of the liquid. The heated fluid then empties into manifold 11 at the inner open end of tube 13 of the collector 10C. Since the manifold has an interior web wall 20, the fluid must enter the exit passage 21 connecting the first cell or receptacle unit of manifold 11 for collectors 10A and 10C, respectively, with the next cell or receptacle of manifold 11 into which tubular collectors 10B and 10D, respectively, are connected. The fluid now travels along the wall of inner tube 13 of the collector 10B and enters the end of the cross-connecting tube 17 for this collector. Fluid flows the length of tube 17 which extends between the interior of collectors 10B and 10D, and ultimately empties into the inner tube 13 of collector 10D. The fluid then passes back along the length of the tubular collector 10D collecting solar energy from the heated (coated) inner tube 13 thereof and, as before, enters the left hand compartment 23 of this manifold cell. This compartment 23 has an exit passage 21 leading to the next inlet side 22 of the succeeding manifold cell. The flow pattern is repeated through each oppositely mounted pair of collectors on manifold 11 until all collectors are traversed. In the last downstream cell or receptacle of the manifold (not shown), the exit passage 21 connects to an exhaust pipe of the system which transports the heated fluid to a place of use, such as a heat exchanger or water supply, engine, or the like (not shown). The selected array of tubes on a manifold section comprise a module, illustrated on FIG. 1. This module may be connected in series or in parallel with another module or modules, as the need arises. Quite often the module comprises 8 or 12 pairs of collector tubes, but the number is variable to suit a particular installation.

Figure 2:
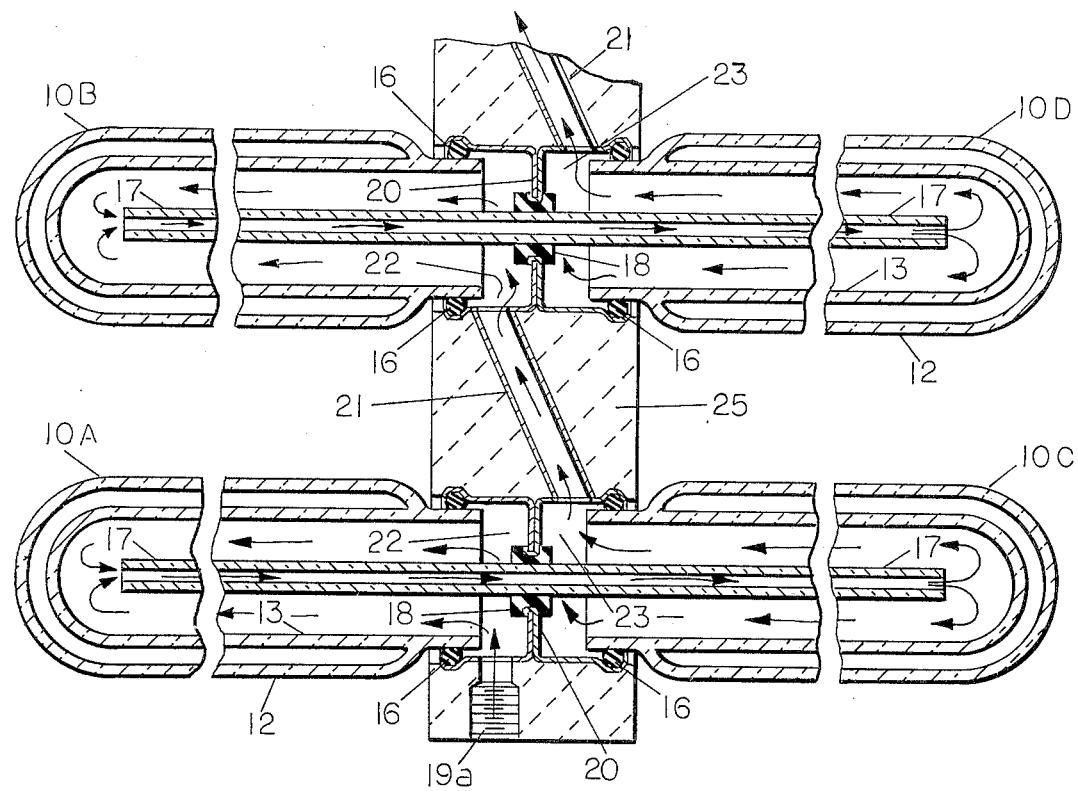
FIG. 2 is a sectional plan view of the assembly of FIG. 1.

The module array, such as shown on FIG. 1, is mounted on the best exposure of the building, such as on the southerly pitch of a roof 24. The collector tubes are supported in a fashion that they are spaced from the surface of roof 24 in accordance with the copending application of George R. Mather, Jr., Ser. No. 549,291, filed Feb. 12, 1975, and owned by the assignee of the present invention. The flow direction shown by the arrows on FIG. 2 is preferred because this flow, in filling the system, always pushes the air (displaces the air) to escape at the top assuring elimination of air bubbles and full fill with liquid to provide effective heat exchange capability. The filling by the just-described flow connections fills all tubes of the module.

As will be described hereinafter, in the manufacture of the manifold 11, the module number of manifold cells or receptacles is encased with an insulation 25, such as a cellular polymer composition. As example of this insulation is a foamed polyurethane having a density of about 8 pounds per cubic foot, or less, or a foamed polyethylene, both materials being readily available in commercial grades and compounds. Fiberglas insulation may also be utilized, or asbestos, depending upon the operating temperature requirements; however, the preferred insulation is a moldable cellular polymer material, such as the polyurethane or polyethylene, because of its ease of handling in manufacture, molding and the like; i.e., the material may be molded about the manifold 11 with ease to form a uniform, cohesive and fine appearing and operating unit.

The exterior of the insulation may be sealed, as desired, by a waterproof, weatherproof coating, or by enclosure in a surface structure, such as sheet metal or the like. The only need for this surface protection is to preserve the insulation 25, in use, against weathering, cracking, breakage or deterioration.

Figure 3:
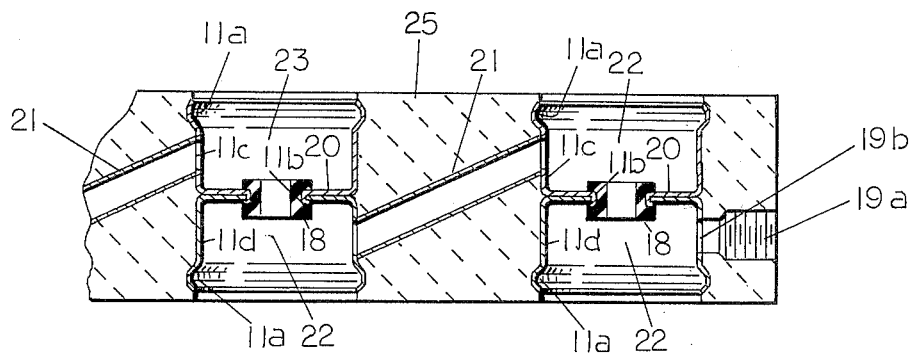
FIG. 3 is a partial sectional plan view of a portion of the manifold shown on FIG. 2.

Referring to FIGS. 2 and 3, the manifold 11 is shown in greater detail. This form of manifold is made by assembly of metal stampings. Metal sheet (e.g. steel) of suitable gauge may be used and stamped in various dies to provide the end grooves 11a in which the gasket or O-ring 16 is seated. The center web wall 20 is shown of double thickness as a result of folding the metal inwardly and pressing it together in the die. The center seal gasket 18 for the cross-connecting tube 17 is held in a punched, centered aperture 11b. The upper or inlet compartment 22 of the manifold cell or receptacle is cylindrical and the port opening for pipe 21 is formed in the metal side wall 11c. Cross-over pipe 21 from exit compartment 23 to the next cell or receptacle inlet compartment 22 is welded onto the side walls 11c and 11d, respectively, at the respective punched-out openings. The cells or receptacles of the manifold stampings for a module are laid out in series, as shown, in however many such cells are needed for a solarcollectur module, say 8 or 12, and the last exit compartment has a pipe connection at the cross-pipe 21 threaded thereon for coupling the module into a system, i.e., the outlet connection will be constructed substantially like the inlet connection 19, 19a, 19b, but at the opposite longitudinal end of the manifold 11. This outlet pipe may be connected to the inlet fitting of a next module of the system or to the fluid supply and storage system, as may be desired. The drawings have not included a full module manifold for ease of illustration; however, to those skilled in the art, the construction detail should be readily apparent.

SECOND EMBODIMENT

Figure 4:
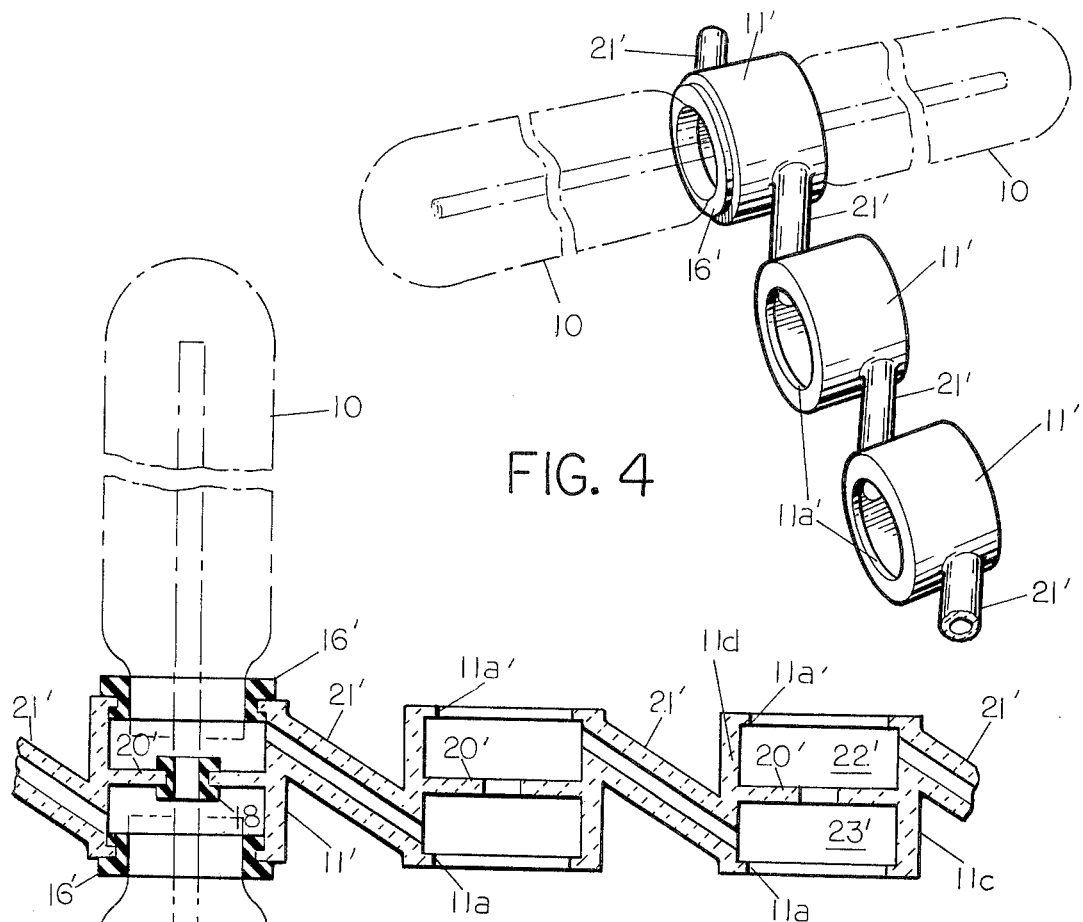
FIG. 4 is a perspective view of the manifold insert of the invention in the form of a casting article, the tubular collectors being illustrated in phantom outline.
Figure 5:
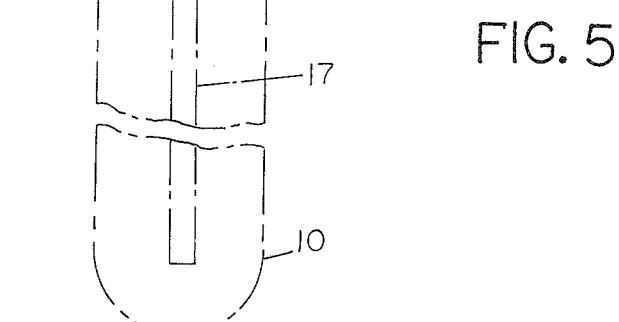
FIG. 5 is a sectional plan view of the manifold casting of FIG. 4, the tubular collectors being shown in phantom outline.
Figure 6:
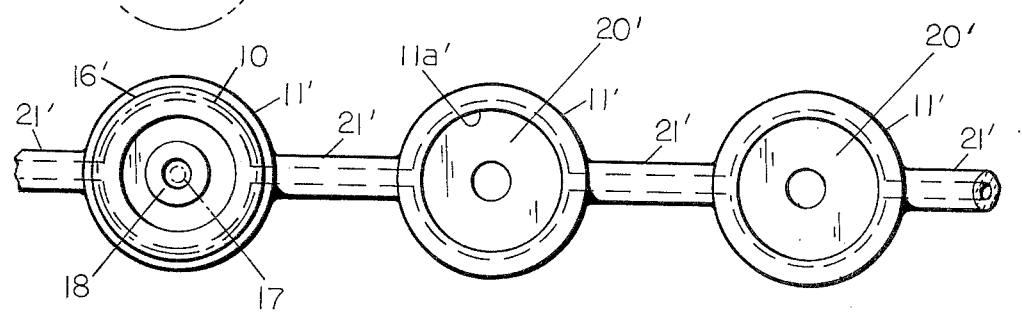
FIG. 6 is a side elevational view of the manifold casting of FIG. 5.

On FIGS. 4–6 is shown a second form of construction for the manifold, which shall be numbered similarly but by the use of prime designation, such as manifold 11'. As shown, fluid flow may occur in either direction. The manifold 11' is formed by casting or die casting and light metals, such as aluminum, white metal or the like may be used. By die casting, the cells of manifold 11' may be made in plural series and these joined as needed at the cross-over pipes 21'. In this form of the manifold, a grommet-style gasket 16' is fitted over either of the opposite end flanges 11a'. the center web 20' is formed with a center aperture which receives the gasket 18' for a cross-connecting tube 17'. The cross-over pipes 21' are for the most part cast integrally in side walls 11c', 11d' of the manifold cell casting 11'. The function of the manifold 11' is the same as described above. The change is in the manner of manufacture. Both embodiments described offer reasonable cost for the making of the manifold. The manifold casting 11' is encased in an insulation body, such as 25 in FIGS. 1–3, in the manner earlier described herein.

THIRD EMBODIMENT

Figure 7:
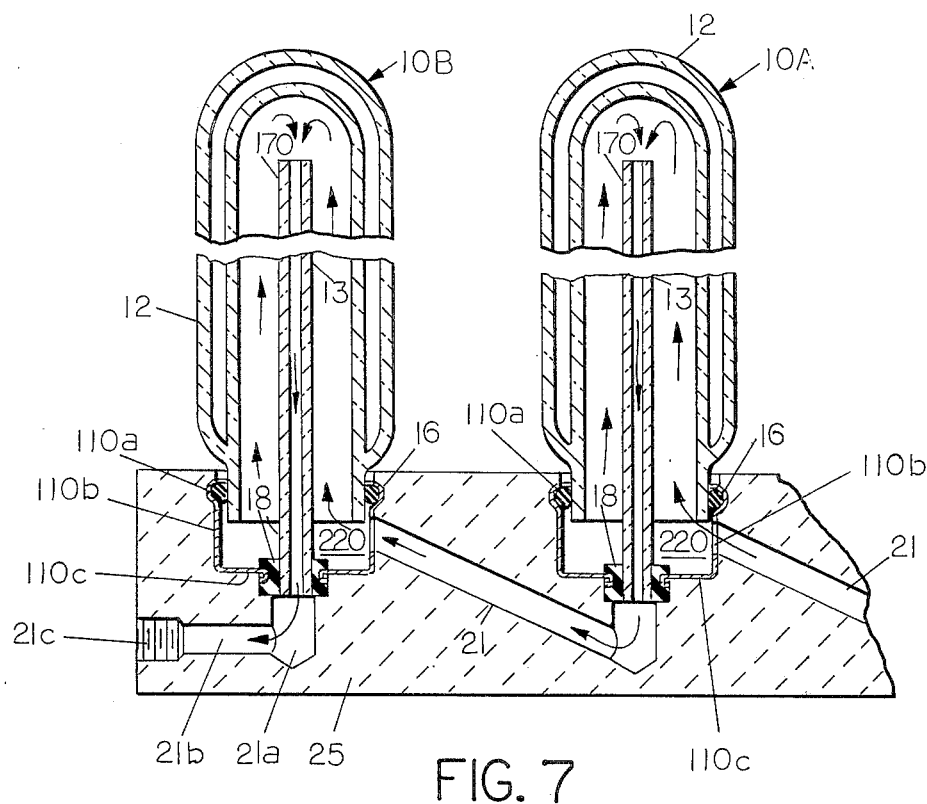
FIG. 7 is a sectional plan view of a second embodiment of the invention in which the tubular solar collectors are assembled along one side of the manifold.
Figure 8:
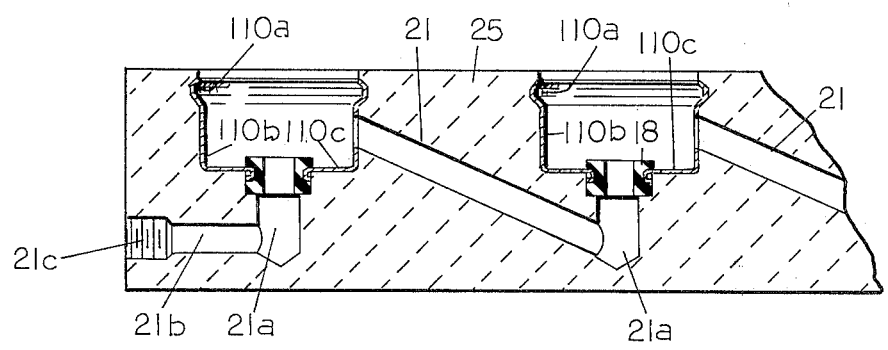
FIG. 8 is a plan view, similar to FIG. 7, illustrating only the manifold structure of this second embodiment.

The principles of the invention thus far described have set forth a double acting manifold and tubular collector array. In FIGS. 7 and 8 is shown a single-acting manifold of the invention and its principles. Similar parts used are given the same numbers as were applied earlier to that part. In essence, the single-acting manifold 110 is a one-half reproduction of the double-acting manifolding 11 shown on FIGS. 1–3.

More specifically, the tubular collectors, such as 10A and 10B shown on FIG. 7, are connected at the end wall of inner tube 13 into the circular aperture at the O-ring gasket 16. Gasket 16 is held in the stamped groove 110a. The annular wall 110b defines the inlet compartment 220 of the manifold, which is connected by pipe 21 to the incoming working fluid. Fluid flows into compartment 220 and along the inner surface of the coated inner tube 13 of the collector 10A. As the fluid reaches the outer end of the collector, it flows back in reverse direction through the tube 170 held by the annular gasket 18. The gasket 18 is retained in the punched center aperture of the end wall 110c, tube 170 fitting snugly in the gasket. Outwardly of gasket 18 there is an end fitting 21a on cross-over pipe 21 which connects into the next compartment 220 of the succeeding manifold cell or receptacle. Fluid flows into the next inlet compartment 220 for tubular collector 10B, and flow there repeats itself until the last tubular collector of the module has been serviced with the working fluid. In the example of FIGS. 7 and 8, for ease of illustration, the last collector is shown at 10B. From end fitting 21a thereof, fluid leaves the module through an end pipe 21b attached to an exhaust pipe connected at threads 21c.

As was the case in the double-acting embodiment described earlier, flow direction of the working fluid may be reversed; that is to say, fluid may be routed in either overall direction of flow in series through the manifold. For the reasons given earlier, the preferred flow pattern is that just described, and as shown by arrows on FIG. 7.

The manifold of FIGS. 7 and 8 are encased in a cast form of cellular polymeric material, such as the foamed polyurethane.

The invention described provides a series connection of a plurality of tubular solar energy collectors, both double-acting and single-acting arrangements, into a module of tubular collectors. The same volume of working fluid is channeled to each tube in the series. The function increases greatly the ease and effectiveness of the manifold and by the structures and techniques described herein, the invention reduces cost.

From the foregoing, it will be apparent that a variety of solar collector modules are provided within the concepts of the invention. While only certain specific embodiments and details for the manufacture of the invention have been described for illustrative purposes, it is evident that various changes and modifications may be made therein without departing from the spirit of the invention. In the appended claims, it is intended that all changes and modifications for those described incidental to the spirit of the invention are to be included as a part of the invention.

Accordingly, the following is claimed as the invention:

I claim:

1. In a solar energy collector apparatus, a manifold means interconnecting plural tubular solar energy collectors with each other in series,
    said manifold means comprising:
    a manifold receptacle for each of said plural tubular solar energy collectors of the apparatus,
    said receptacle having an annular side wall providing a chamber having a mouth opening at one exial end,
    an end wall means connected with said side wall closing the other axial end of said chamber,
    a gasket seat on said side wall adjacent said one axial end,
    an annular gasket in said seat,
    an aperture in said end wall means,
    an annular sealing gasket means encircling said aperture, and
    a port in said side wall connected to the chamber;
    each of said plural tubular solar energy collectors comprising a double-walled glass collector tube having a closed end and an open end, the open end of said collector tube being sealingly mounted in said mouth opening of a manifold receptacle by engagement with said annular gasket thereof,
    an elongated, fluid connecting tube extending through said sealing gasket means and into the interior of a double-walled collector tube, the one end of said fluid connecting tube being disposed adjacent the closed end of said collector tube, a heat exchange fluid, and a fluid conducting means connecting the other end of said fluid connecting tube and the side wall port of another receptacle such that said fluid is adapted for circulation (1) through the plural tubular solar energy collectors in series, and (2) in a reverse flow path within each of said tubular collectors.

2. The solar energy collector apparatus of claim 1 in which the fluid conducting means between a fluid connecting tube in one manifold receptacle and the side wall port of another manifold receptacle comprises a fluid conduit connected therebetween.

3. The solar energy collector apparatus of claim 1 in which said receptacles are disposed in pairs on a common axis and the mouth end openings of each receptacle of a pair are disposed in opposite facing directions along said axis, the said collector tubes extending outwardly from each said pair of receptacles in opposite axial directions, the fluid conducting means connecting the other end of the elongated fluid connecting tube in one of the receptacles of the pair thereof and the side wall part of another receptacle of another pair of receptacles is provided for by flow of fluid from said other end of the fluid connecting tube into a collector tube encircling same and into the other receptacle of the pair, and a fluid conduit connected between the port of said other receptacle of the pair and the port of a receptacle in another pair of said receptacles.

4. The solar collector apparatus of claim 1, wherein the manifold cell member is encapsulated substantially with foamed, cellular polymeric compound as an insulation of the manifold against heat transmission.

5. The solar collector apparatus of claim 4, wherein the polymeric compound comprises a foamed polymer selected from the group consisting of polystyrene, polyurethane and polyethylene.

6. The solar collector apparaus of claim 4, wherein said encapsulated insulation of foamed, cellular polymeric compound includes an exterior, impervious layer over the exterior of said insulation encapsulation compound.

7. The solar collector apparatus of claim 1, wherein said manifold cell member comprises metal stampings.

8. The solar collector apparatus of claim 1, wherein said manifold cell member comprises a metal die casting.

9. In a solar energy collector apparatus, a manifold receptacle for tubular solar energy collectors comprising an annular side wall defining an elongated chamber, a mouth opening at each axial end of said chamber, a gasket seat in said side wall adjacent each said mouth opening and surrounding the latter, an annular gasket in each said seat, an internal wall dividing said chamber into two compartments, each being adjacent one of said mouth openings, a central aperture in said internal wall, an annular seal gasket in said central aperture, a pair of ports in the side wall, one being opposite each of said compartments of said chamber, a pair of double-walled transparent glass collector tubes each having a closed end and an open end, the open end of each of said collector tubes being sealingly mounted in said mouth opening by said annular gasket thereof, the collector tubes extending outwarly from opposite axial ends of said receptacle, a connecting tube extending through said seal gasket centrally of said internal wall, the opposite ends of the connecting tube extending into the interior of the opposite pair of double-walled collector tubes to near each of their closed ends, a fluid conduit connected to one of said ports for introducing liquid into one compartment of said receptacle chamber, and a fluid conduit connected to the other of said ports for transferring liquid out of the other of said compartments of the chamber, and a heat exchange liquid filling said chamber, said pair of collector tubes and connecting tube, which liquid is adapted for circulation in a reversed flow path through each of the collector tubes and the connecting tube.

10. The solar collector apparatus of claim 9, in which plural manifold receptacles are series connected together by conduit means to provide a module of said solar double-walled collector tubes.

11. The solar collector apparatus of claim 10, wherein the series of manifold receptacles and conduit means connecting them are encased in a cellular polymeric insulation.

12. The solar collector apparatus of claim 10, wherein the plural manifold receptacles are metal die castings and connected one to the other for liquid flow by a pipe connecting the outlet port of the one said compartment exhausting liquid of one receptacle and transferring such liquid into the inlet port of the next, adjacent receptacle, thereby circulating the liquid in series through said plural manifold receptacles of the solar collector module.

13. A solar collector apparatus comprising
plural double-wall transparent glass tubes, the space between the walls of each tube being sealed at a subatmospheric pressure, having a closed end and an open end,
plural manifold receptacles for the tubes each comprising an annular side wall defining an annular aperture at opposite axial ends for receiving the open end of said glass tubes in opposed spaced relationship, a gasket retained by the side wall at each aperture and surrounding the perimeter of said aperture for sealingly engaging a glass tube and said side wall thereat, a central, transverse dividing wall spaced inwardly of the end apertures and integrally connected with the annular side wall, said dividing wall separating the receptacle into first and second opposed chambers and including a central aperture therethrough, an annular sealing gasket means in said central aperture, a connecting tube through said central gasket means in sealing engagement and extending on either axial side thereof, one end thereof being inside a collector tube and spaced from its closed end, the other end thereof being inside the opposite collector tube and spaced from its closed end, said first chamber adapted for receiving liquid and filling the interior of one of the collector tubes for flow thereof through said connector tube into and filling the other of said opposed collector tubes, said second chamber adapted for collecting liquid from the said other collector tube, an inlet port in said side wall for said first chamber and an outlet port in said side wall for said second chamber, inlet conduit means for connecting the inlet port of a first of said plural receptacles, a cross conduit means connecting the outlet port of each of the receptacles to the inlet port of the next adjacent receptacle, said manifold receptacles being thereby connected in series flow relationship, outlet conduit means for connecting the outlet port of the last in the series of receptacles, and
a liquid, filling said manifold receptacles, connecting tubes, collecting tubes, and the inlet and outlet conduit means, the liquid being adapted to cycle through the manifolds and their collecting tubes in series flow for a heat exchange of solar energy collected by said collector tubes.

* * * * *

UNITED STATES PATENT OFFICE
CERTIFICATE OF CORRECTION

PATENT NO. : 4,018,215
DATED : April 19, 1977
INVENTOR(S) : Yu K. Pei

It is certified that error appears in the above-identified patent and that said Letters Patent are hereby corrected as shown below:

Col. 3, line 10, "exists" should be --exits;

line 67, "As" should be --An--.

Col. 4, line 36, "solarcollectur" should be --solar collector--;

line 61, "the" should be --The--.

Col. 6, line 11 (Claim 1), "exial" should be --axial--;

line 54 (Claim 3), "part" should be --port--.

Col. 7, line 1 (Claim 6), "apparaus" should be --apparatus--;

line 31 (Claim 9), "opposite" should be --opposed--.

Signed and Sealed this

Eighteenth Day of October 1977

[SEAL]

Attest:

RUTH C. MASON
Attesting Officer

LUTRELLE F. PARKER
Acting Commissioner of Patents and Trademark